US008672413B2

(12) United States Patent
Morrissey

(10) Patent No.: US 8,672,413 B2
(45) Date of Patent: Mar. 18, 2014

(54) CHILD SAFETY SEAT ADJUSTABLE MAGNETIC SLEEVE AND HANDLE ASSEMBLY RETROFIT

(76) Inventor: Brian J. Morrissey, Newburgh, IN (US)

( * ) Notice: Subject to any disclaimer, the term of this patent is extended or adjusted under 35 U.S.C. 154(b) by 51 days.

(21) Appl. No.: 13/385,229

(22) Filed: Feb. 10, 2012

(65) Prior Publication Data

US 2013/0207441 A1    Aug. 15, 2013

(51) Int. Cl.
*B60R 21/02* (2006.01)
*B60R 22/10* (2006.01)
*B60N 2/26* (2006.01)

(52) U.S. Cl.
CPC .............. *B60N 2/265* (2013.01); *B60R 22/105* (2013.01)
USPC .......................................... 297/482; 297/481

(58) Field of Classification Search
USPC ..................... 297/481, 482, 219.12
See application file for complete search history.

(56) References Cited

U.S. PATENT DOCUMENTS

| 5,201,099 | A  | * | 4/1993  | Campbell ..................... 24/198 |
| 5,839,793 | A  | * | 11/1998 | Merrick et al. ............... 297/484 |
| 6,457,774 | B2 | * | 10/2002 | Baloga ....................... 297/250.1 |
| 7,347,500 | B2 | * | 3/2008  | Clifton, Jr. ................... 297/482 |
| 7,445,293 | B2 | * | 11/2008 | Smith et al. .................. 297/484 |
| 8,240,772 | B2 | * | 8/2012  | Kawata et al. ............... 297/482 |
| 8,408,656 | B2 | * | 4/2013  | Carpenter .................... 297/468 |
| 2011/0006572 | A1 | * | 1/2011 | Zhao ........................ 297/256.15 |
| 2011/0133528 | A1 | * | 6/2011 | Keith et al. ............. 297/216.11 |
| 2011/0227392 | A1 | * | 9/2011 | Morrissey ................... 297/482 |
| 2013/0015691 | A1 | * | 1/2013 | Feng et al. .............. 297/256.15 |

* cited by examiner

*Primary Examiner* — Sarah B McPartlin

(57) ABSTRACT

A web harness system for use with a child safety seat device for use in automobiles. The web harness having two spaced apart shoulder straps, each having a buckle insert and a latchable connector having two separable components attached. A first integrally formed structure including sleeve covers having a an upper portion, a central portion, and a lower portion coupled to the web harness and latchable connector. A second integrally formed structure including an upper sleeve portion spaced apart from a lower sleeve portion capturing a buckle insert coupled on the shoulder straps. A lower connecting buckle member includes a rotatable handle attached, providing a grasping and manipulating opportunity.

16 Claims, 1 Drawing Sheet

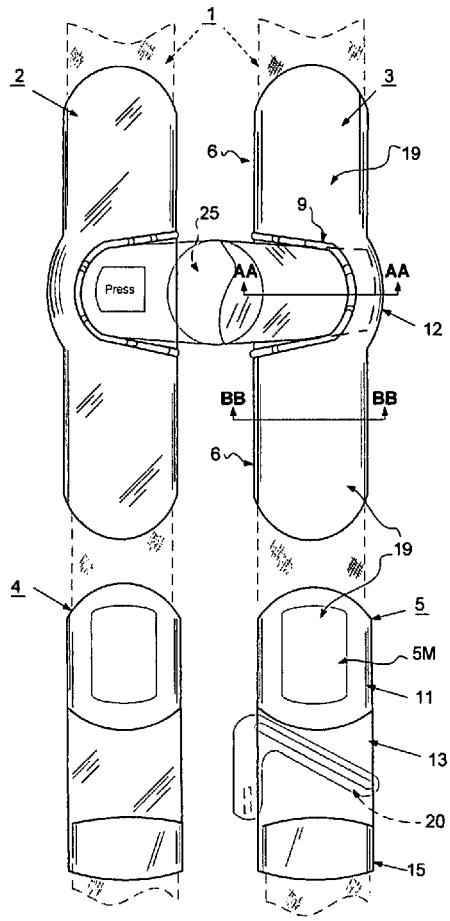
FIG. 1
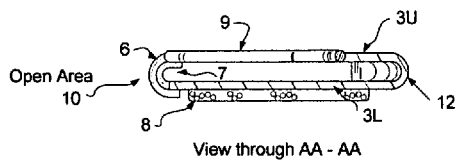
FIG. 2  View through AA - AA
(Web and connector omitted)
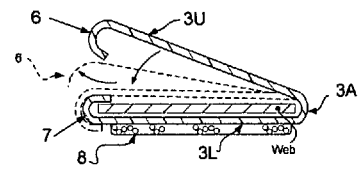
FIG. 3  View through BB-BB
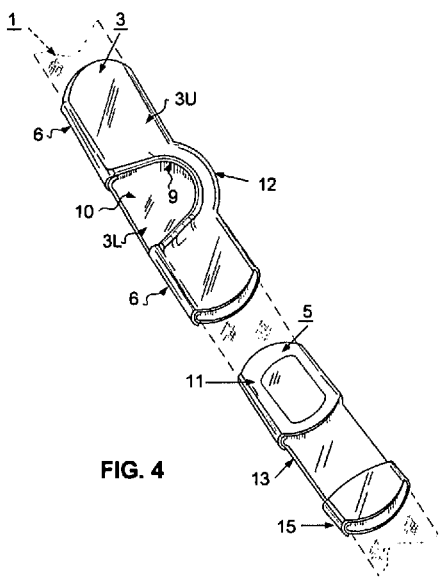
FIG. 4
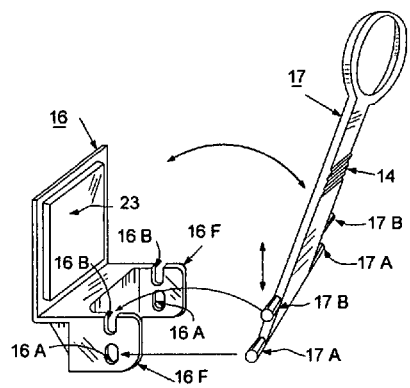
FIG. 5
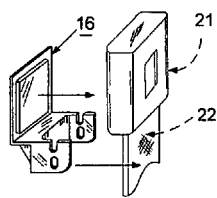
FIG. 6

CHILD SAFETY SEAT ADJUSTABLE MAGNETIC SLEEVE AND HANDLE ASSEMBLY RETROFIT

BACKGROUND OF THE INVENTION

When transporting children within a vehicle it is required the child be restrained within a safety car seat. Within this seat a child is restrained in a five point safety harness. This harness is connected to anchor points on the upper and lower portions of a safety shell. The harness has two web members extending from the upper portion of the seat, placed over a child's shoulders. Each web is connected laterally at a point, one to another, proximate the child's chest area.

At the lower portion, the webs are connected at a second position with a buckle, achieved through inserting a pair of tangs, attached to each web, into the buckle.

To remove a child from the harness, both the upper and lower connections are disconnected.

As a result of disconnecting the stated harness web connections and removing a child, the webs and attached connectors fall within a depression or concavity formed by the contours of the seat.

The seat contours are such that the lower buckle also falls into this depression.

As a result of the position of these webs within the seat, a child, when replaced within the seat, is placed over the webs and attachments, covering them.

This necessitates reaching into the seat depression to locate, and retrieve each web from underneath the child, requiring moving and possible discomfort of the child.

The same is true when locating and retrieving the tangs and buckle from underneath the child.

These actions require the adult to spend additional time, mostly with the vehicle door open, often in inclement or hot weather, to correctly install a child safely within the safety seat.

This is the situation as described in a previous application, (U.S. Ser. No. 12/661,624 Published Sep. 22, 2011) and referenced in this current application, for use in a child safety seats fitted within a motor vehicle.

OBJECT OF THE INVENTION

It is an object of this invention to provide a retrofit of sleeves and handle, that can be fitted to an existing child's safety seat without any disassembly, or part replacement required.

It is an object of this invention to provide an upper plurality of sleeves attached to the harness web of a safety seat, and to partially enclose an existing web connector within the above mentioned sleeves It is an object of this invention to provide a lower sleeve assembly containing an embedded magnet, and to create an area to locate and capture a lower buckle insert member.

It is also an object of this invention to provide an attachment, fitted to an existing lower buckle assembly, to attach a rotatable handle.

It is a further object of this invention to provide adjustment of the position of the upper sleeves to accommodate differences in size and age of children.

It is a further object of this invention to display graphics of cartoon characters and the like, suitable for the entertainment and amusement of a child, on a outward facing visible portion of the sleeves.

FIELD OF THE INVENTION

The present invention relates to a harness assembly set within a child's safety seat within a motor vehicle.

SUMMARY OF THE INVENTION

In the aforementioned patent application, the embodiment described is suited toward the original manufacturing process of child safety seats, to be included in the process of initial assembly.

It also required a lower buckle assembly to contain built in modifications to attach a handle portion.

In order to extend the benefits contained in the previous application to existing car seats presently in use it would require extensive disassembly, and part replacement. This is wasteful in material and time, and unnecessary.

In this present application a retrofit assembly is presented whereby a total sleeve and handle assembly may be fitted to existing child seats without any disassembly, or part replacement required.

This extends the use of this invention to car seats presently in use, and adds a function of adjustment to suit differences in size and age of children.

In this present application a first pair of sleeves are fitted to an upper portion of the web. This is made possible by each sleeve having one open longitudinal edge, the opposite edge forming a natural hinge, allowing an upper and lower portion of the sleeve to be spread apart. In this configuration it is possible to slide the sleeve lengthwise over the web strap into a position that encloses a portion of the web.

The open longitudinal sleeve edge is required to be closed around the web. One such closure method involves adding to the open longitudinal edge portion a curled edge member. The lower portion of the sleeve having an upward curl, and the upper portion of the sleeve having a slightly larger, downward curl.

The upper curl is stretched to a more open aspect, and fitted around the lower curl, where it springs back to an original shape and forms a plurality of interlocking curls. Therefore a complete attachment around the web strap is achieved, and each sleeve upper and lower portions are longitudinally joined.

In existing web harnesses, each web is connected one to another, using an interlocking web connector, having a web threaded through each connector part. (An example is Glover U.S. Pat. No. 6,662,413).

This results in the connector protruding beyond the web edge at an outermost location on each web.

Provision is made in this application to form a contour at the edge of each sleeve outer edge, to accommodate the portion of a connector that projects beyond the web profile.

To ensure access to a release button located on some types of connectors, an open area is provided on an upper portion of each sleeve. (Some connectors have a right hand release button, some have a left hand release button.)

This open area, and contoured edge profile, makes it possible to slide the sleeve over a connector and web strap combination, securing the sleeve as detailed above, with each curled portion forming a closure.

Thus the entire sleeve assembly is adjustable, sliding along the web strap in concert with the web connector.

Set upon a lower position of the web harness as described above, is a second sleeve assembly, consisting of a short sleeve magnet holder on an upper end, and a short sleeve set on the distal end.

These shorter sleeves are separated by a strap, basically a continuation of the lower portion of the sleeve. The distance between the upper and lower short sleeves is a set distance to accommodate the length of an existing buckle insert. In existing seats the inserts are free to slide down the web strap into the seat edge connection with the seat bottom, a position difficult to retrieve the insert from when buckling a child in to the seat.

Placing the buckle insert (threaded through the web) between each short sleeve, contains the insert in a captured position on the web strap relative to the buckle. The first short sleeve includes an enclosed magnet that is attached to a different magnet set on the side of the safety seat, as described in the previous application. The method of attaching the short sleeve assembly to the web strap is exactly as described previously for the first pair of sleeves set upon the upper portion of the web strap.

The lower portion of the web harness is connected at a buckle, achieved through inserting a pair of tangs into the buckle, providing a five point harness containment system. The buckle is in turn attached to the seat bottom by a short web strap.

A handle attachment is added to the buckle allowing manipulation between a first position, whereby the tangs and webs are connected, and a second position whereby the buckle is positioned at the lower edge of a seat, clear of an area that causes interference when placing a child into the seat.

A handle attachment member is now described. A plastic formed member, having on one part an adhesive panel, for attachment to the rear side of the buckle. The handle attachment also includes two protruding parallel flange members. When in position attached to the buckle, the flange members straddle an upper portion of the short web strap, and protrude to provide an attachment means to connect a handle.

There are many ways available to attach the handle to these protruding flanges. Such a handle maybe constructed of a rigid, or flexible design. One such way is to have vertical elongated holes located on a lower portion of each mentioned flange to capture pivot pins, and slots to capture protuberances (described later), located on a handle.

A handle having, at a lower end, two protruding pivot pins, set each side of a handle stem, and two protuberances similarly attached. Each pivot pin is inserted into each elongated hole, connecting the handle to the handle attachment member. This allows the handle to be joined to the handle attachment member, in a way that rotation to an up first position, and down to a second, lower position is possible By using slots located on the top of each flange, provides a method of engaging the protuberances located on the handle. By lifting and pulling up on the handle, and by lowering and pushing down on the handle, into the slots provided, captures and locks the handle in the first mentioned up position.

With a handle connected as described, the buckle can be manipulated into the insert connected position, or moved down and pulled toward the seat edge, being stored in an area that will not be covered when placing a child into the seat.

A slightly roughened area is formed on the outside stem of the handle. This area is in contact with the seat covering material when the handle is in a down position as stated above. This provides additional grip to hold the handle in place. An alternative is a Velcro type fastening that may be used.

It will be noted by those skilled in the art that although only one example of sleeve longitudinal closures, and one example of handle attachment to a buckle are described, other methods are available to achieve the same results.

BRIEF DESCRIPTION OF THE DRAWINGS

The embodiment of the present invention will be illustrated by reference to the following drawings.

FIG. 1. Is a frontal view of an upper pair, and a lower pair of sleeves.

FIG. 2 and FIG. 3. Illustrates cross sections through one upper sleeve.

FIG. 4. Is a perspective view of both upper and lower sleeves.

FIG. 5. Shows a perspective view of a handle attachment member and attached handle.

FIG. 6. Illustrates a handle attachment member positioned to attach to an existing buckle.

DESCRIPTION OF THE PREFERRED EMBODIMENT

FIG. 1 shows a child's safety seat web harness as found in conventional safety seats fitted within a motor vehicle. The upper shoulder straps 1 are enclosed within a pair of sleeves 2 and 3, set upon an upper portion of the web, and can be slid up or down the web, in concert with an existing web connector 25.

A shorter sleeve assembly 4 and 5 are shown, set upon a lower portion of the web.

For simplicity the following description is of sleeves 3 and 5, as both sleeve sets 2 and 4 are identical mirror images.

Sleeve 3 encloses an upper portion of web 1, having been sprung open longitudinally on one edge and placed over web 1. This open edge is located to the inside of the lateral width of web 1.

The same is true of the short sleeve assembly 5. An existing buckle insert 20 is positioned between sleeve 11, and lower sleeve 15, with web 1 threaded through insert 20. Thus insert 20 is held in position relative to buckle 21.

The upper face of each sleeve is visible, presenting areas 19 for the addition of graphics, such as cartoon characters and like for the child's amusement and entertainment.

Sleeve 5 contains an enclosed magnet 5M, described and utilized as stated in an earlier mentioned application.

FIGS. 2 and 3 best illustrate the web covering method. Sleeve 3 has a natural hinge 3A along one edge, and is open at the distal edge, and sprung open as previously mentioned. This edge has an upper member 3U, terminating in an upper curl 6, and a lower member 3L, terminating in a lower curl 7. The web is enclosed within sleeve 3, with an edge of web 1 covered by the inside of curl 7.

Curl 6 is slightly larger than curl 7, and is pulled and distorted slightly to fit over curl 7, then released whereby curl 6 returns to a normal position, enclosing the outside of curl 7.

This plurality of curls forms a closure along the sleeve longitudinal edge.

The underside of the sleeves are covered by a foam layer 8, to add to the comfort and safety of a child.

In existing seats the web straps are joined by latchable connectors (FIG. 1. 25) to secure each web, one to another.

The webs are threaded through connector 25, resulting in a portion of the connector protruding outside the width of the web. To allow for such a protruding portion of web connector 25, the profile of the sleeve is shaped 12 to cover the connector edge. The profile portion 12 may also be cut away to let the connector end protrude outside of the sleeve. (Not shown)

FIG. 4 shows such a profile 12, strengthened in part by reinforced edge 9, shaped to surround a connector 25. Open area 10 is provided to give access to a release button found on some designs of connectors.

FIGS. 5 and 6 depicts a handle attaching member 16, including an adhesive panel 23 to attach to a rear vertical face of existing buckle 21. In this position two flange members 16F straddle an upper portion of short web 22, protruding beyond the web at both sides. This forms attachment points whereby a handle may be attached.

Handle 17 is shown, indicating pivot pins 17A being inserted into elongated holes 16A, whereby the handle and buckle are attached. The handle 17 can now be rotated between an upper, and a lower position. Lifting handle 17 up, sliding within elongated holes 16A, allows protrusions 17B to be rotated over flanges 16F, and lowered into slots 16B, whereby handle 17 is locked into an upper position.

Handle 17 is lifted free of slots 16B, and rotated into a lower position toward the seat edge, being stored in an area that will not be covered by placing a child into the seat. At this lower position a roughened patch 14, on the handle stem contacts the seat covering material, providing additional grip to hold in place.

What is claimed is:

1. A web harness system for use with a child safety seat device having a web harness comprising two spaced apart shoulder straps, each having a buckle insert set thereon a latchable connector having two separable components, and a tether strap terminating in a buckle for selectively coupling with said buckle inserts, the system comprising:
   a first set of two sleeve covers, each sleeve cover being integrally formed and having a front side, a back side, an upper portion configured to be coupled to one of said shoulder straps above the latchable connector, a central area configured to surrounding a portion of the latchable connector, and a lower portion configured to be coupled to one of said shoulder straps located below the latchable connector;
   a second set of two sleeves, each sleeve being integrally formed and having a front side, a back side, an upper sleeve portion spaced apart from a lower sleeve portion and configured to be located on one of said shoulder straps; a rotatable handle attaching member configured to be attached to said buckle, and wherein said front side and said back side of said first set of two sleeves each having a separable longitudinal edge opposite an edge forming a natural hinge such that each of said first set of two sleeves ma be spread apart longitudinally.

2. A web harness system according to claim 1, whereby said longitudinal edges of said back side having an upward facing curl, and said longitudinal edge of said front side having a downward facing curl.

3. A web harness system according to claim 2 wherein said upward facing curls covers an edge portion of one of said shoulder straps, and said downward facing curls interlocks over said upward facing curls, one curl overlaying another thereby forming a releasable closure.

4. A web harness system according to claim 1, wherein said central area of each of said first set of two sleeves includes a front side open area sized to surround a portion of said latchable connector, and a back side portion underlying said latchable connector.

5. A web harness system according to claim 1, wherein said front side and said back side of said second set of two sleeves, each having a separable second longitudinal edge opposite a second edge forming a second natural hinge, such that each of said second set of two sleeves may be spread apart longitudinally.

6. A web harness system according to claim 5, whereby said second longitudinal edges of said back side having a second upward facing curl, and said second longitudinal edge of said front side having a second downward facing curl.

7. A web harness system according to claim 6 wherein said second upward facing curls covers a second edge portion of one of said shoulder straps, and said second downward facing curls interlocks over said second upward facing curls, one curl overlaying another, thereby forming a releasable closure.

8. A web harness system according to claim 5, wherein upper and lower sleeves portions are spaced apart to accommodate and capture said buckle inserts positioned between said upper and lower sleeve portions.

9. A web harness system according to claim 8, whereby said upper sleeve portion contains an embedded magnet set therein.

10. A web harness system according to claim 5, wherein said second set of two sleeves are slid lengthwise over said respective shoulder straps and said buckle inserts, as a single unit and coupled thereon.

11. A web harness system according to claim 1, whereas said buckle inserts on said shoulder straps are positioned so that a coupling of said buckle insert and said buckle may be achieved with minimal movement of said buckle insert.

12. A web harness system according to claim 1, wherein said first set of two sleeves are slid lengthwise over said respective shoulder straps and said latchable connector, as a single unit, and coupled thereon.

13. A web harness system according to claim 1, said first set of two sleeves each further including a front facing portion for displaying indicia.

14. A web harness system according to claim 1, wherein said rotatable handle attaching member includes two protruding flanges orthogonally set to straddle said tether strap, such as to protrude beyond said tether strap, said protruding flanges providing a rotatable handle attachment.

15. A web harness system according to claim 14, whereas a rotatable handle is attached having a first end anchored to said protruding flanges thereof, and a second free end overlaying an upper portion of said buckle and said shoulder straps in one direction, and overlaying a portion of a seat bottom edge in another direction.

16. A web harness system according to claim 1, whereas said child's safety seat device is a transportable safety seat for use in automobiles.

* * * * *